(12) United States Patent
Chen et al.

(10) Patent No.: US 12,221,526 B2
(45) Date of Patent: Feb. 11, 2025

(54) METHOD FOR PREPARING SPHERICAL OR ANGULAR POWDER FILLER, SPHERICAL OR ANGULAR POWDER FILLER OBTAINED THEREFROM, AND USE THEREOF

(71) Applicant: Zhejiang Third Age Material Technology Co., Ltd., Huzhou (CN)

(72) Inventors: Shuzhen Chen, Huzhou (CN); Rui Li, Huzhou (CN)

(73) Assignee: Zhejiang Third Age Material Technology Co., Ltd., Huzhou (CN)

( * ) Notice: Subject to any disclaimer, the term of this patent is extended or adjusted under 35 U.S.C. 154(b) by 0 days.

(21) Appl. No.: 17/263,047

(22) PCT Filed: Feb. 22, 2019

(86) PCT No.: PCT/CN2019/075832
§ 371 (c)(1),
(2) Date: Jan. 25, 2021

(87) PCT Pub. No.: WO2020/019709
PCT Pub. Date: Jan. 30, 2020

(65) Prior Publication Data
US 2021/0309832 A1    Oct. 7, 2021

Related U.S. Application Data

(63) Continuation of application No. PCT/CN2018/097327, filed on Jul. 27, 2018.

(51) Int. Cl.
C08K 5/5419    (2006.01)
C08K 3/36      (2006.01)

(52) U.S. Cl.
CPC .............. *C08K 5/5419* (2013.01); *C08K 3/36* (2013.01)

(58) Field of Classification Search
CPC ................... C08K 5/5419; C08K 3/36

USPC .......................................................... 524/267
See application file for complete search history.

(56) References Cited

U.S. PATENT DOCUMENTS

| | | | |
|---|---|---|---|
| 2004/0013858 A1* | 1/2004 | Hacker | H01L 21/02359 430/329 |
| 2019/0002642 A1* | 1/2019 | Knoer | A61Q 19/00 |

FOREIGN PATENT DOCUMENTS

| | | |
|---|---|---|
| CN | 1810858 A | 8/2006 |
| CN | 105080440 A | 11/2015 |
| CN | 107177042 A | 9/2017 |
| JP | 2002146232 A | 5/2002 |

* cited by examiner

*Primary Examiner* — Kelechi C Egwim
(74) *Attorney, Agent, or Firm* — Olive Law Group, PLLC

(57) ABSTRACT

The present invention relates to a method for preparing a spherical or angular powder filler, comprising providing a spherical or angular siloxane comprising T units; performing a heat treatment on the spherical or angular siloxane, the heat treatment temperature between 250° C. and the temperature of oxidative decomposition of organic groups, so that silicon hydroxyl groups in the spherical or angular siloxane are condensed to obtain a condensed siloxane; and adding a treatment agent to treat the condensed siloxane to promote the condensation of silicon hydroxyl groups in the condensed siloxane to give a spherical or angular powder filler, the treatment agent comprising a silane coupling agent and/or disilazane, and the quotient of the molecular weight of at least a portion of the silane coupling agent and/or the disilazane divided by its specific gravity at 25° C. being less than or equal to 210. The present invention also provides a spherical or angular powder filler obtained therefrom. The present invention further provides use of above spherical or angular powder filler. The filler provided by the present invention has low permittivity, low permittivity loss, without conductive impurities, without coarse oversize particles, and low radioactivity.

10 Claims, No Drawings

METHOD FOR PREPARING SPHERICAL OR ANGULAR POWDER FILLER, SPHERICAL OR ANGULAR POWDER FILLER OBTAINED THEREFROM, AND USE THEREOF

This application is a 371 of international PCT/CN2019/075832 filed Feb. 22, 2019 which claims priority to PCT/CN2018/097327, filed Jul. 27, 2018, the contents of which both are hereby incorporated by reference.

BACKGROUND OF THE INVENTION

1. Field of the Invention

The present invention relates generally to semiconductor packages, and more particularly to a method for preparing a spherical or angular powder filler, spherical or angular powder filler obtained therefrom, and use thereof.

2. Related Art

In the packaging step of the semiconductor back-end process, packaging materials are required, such as molding compound, patch glue, underfill material or chip carrier. In addition, circuit boards, such as high density inerconnects (HDI), high-frequency high-speed boards or motherboards, are required when assembling an equipment from devices, such as passive elements, semiconductor elements, electroacoustic components, display components, optical components or radio frequency components. These packaging materials and circuit boards are mainly composed of organic polymers, such as epoxy resin, aromatic polyether or fluororesin, and fillers. The filler is generally spherical or angular silicon dioxide, and its main function is to reduce the thermal expansion coefficient of the organic polymer. The existing filler is tightly packed from spherical or angular silicon dioxide, wherein the chemical structure of the silicon dioxide is Q unit of Si, i.e., $SiO_4$—.

On the one hand, along with the technology progress, the signal frequency used by semiconductors is getting higher and higher, and the high-speed and low-loss signal transmission requires fillers with low permittivity and low permittivity loss. On the other hand, the permittivity (also known as dielectric constant) and permittivity loss (also known as dielectric loss) of the material basically depend on the chemical composition and structure of the material. Silicon dioxide has its inherent permittivity and permittivity loss. Therefore, the existing filler cannot meet the requirement of lower permittivity and lower permittivity loss.

Similarly, along with the technology progress, the integration of semiconductors is getting higher and higher, and the smaller and smaller size requires fillers with high purity, without conductive impurities and without coarse oversize particles. However, it is difficult to avoid the coarse oversize particles and conductive impurities in the existing spherical or angular silicon dioxide. Moreover, once coarse oversize particles and conductive impurities have been mixed, they cannot be removed by dry methods. Therefore, the existing filler cannot meet the requirement without conductive impurities and without coarse oversize particles.

For semiconductor memories, the filler is required to have low radioactivity. However, the existing spherical or angular silicon dioxide has a purity largely depending on the purity of natural minerals. Therefore, the existing filler cannot meet the requirement of low radioactivity.

SUMMARY OF THE INVENTION

The present invention provides a method for preparing a spherical or angular powder filler, a spherical or angular powder filler obtained therefrom, and use thereof. The provided filler has low permittivity, low permittivity loss, without conductive impurities, without coarse oversize particles and with low radioactivity.

The present invention provides a method for preparing a spherical or angular powder filler, includes the steps of: S1, providing a spherical or angular siloxane comprising T units, wherein the T unit=$R_1SiO_3$—, and $R_1$ is a hydrogen atom or an organic group independently selected from $C_1$-$C_{18}$; S2, performing a heat treatment on the spherical or angular siloxane, the heat treatment temperature between 250° C. and the temperature of oxidative decomposition of the organic group, so that silicon hydroxyl groups in the spherical or angular siloxane are condensed to obtain a condensed siloxane; and S3, adding a treatment agent to treat the condensed siloxane to promote the condensation of silicon hydroxyl groups in the condensed siloxane to give a spherical or angular powder filler, the treatment agent comprising a silane coupling agent and/or disilazane, the weight percentage of the treatment agent being 0.5-50 wt %, and the quotient of the molecular weight of at least a portion of the silane coupling agent and/or the disilazane divided by its specific gravity at 25° C. being less than or equal to 210.

Different from the existing silicon dioxide filler only containing Q units, the silicon dioxide of the spherical or angular powder filler of the present invention comprises T units, wherein the introduction of organic group R greatly reduces the permittivity and the permittivity loss. In addition, since the T unit has only three SiOSi bridging points, its thermal expansion coefficient is higher than that of the Q unit of silicon dioxide. Therefore, an appropriate amount of Q units can be introduced as needed to adjust the balance of the permittivity, the permittivity loss and the thermal expansion coefficient. Although the condensed siloxane obtained by the heat treatment has a high degree of condensation by heating, new isolated outer surface Si—OHs and internal cracked surface Si—OHs (also collectively referred to as surface Si—OHs) are produced due to the spatial geometric limitation, therefore, the treatment agent is subsequently added to promote the condensation of surface Si—OHs of the siloxane, thereby further reducing the permittivity and the permittivity loss. Specifically, the silane coupling agent or disilazane, the quotient of whose molecular weight divided by its specific gravity at 25° C. is less than or equal to 210, can enter the internal cracks of the powder due to its small molecule, and thus can promote the condensation of the internal cracked surface Si—OHs.

Preferably, the spherical or angular siloxane of S1 further comprises Q units, D units, and/or M units, wherein the Q unit=$SiO_4$—, D unit=$R_2R_3SiO_2$—, M unit=$R_4R_5R_6SiO_2$—, and each of $R_2$, $R_3$, $R_4$, $R_5$, $R_6$ is a hydrogen atom or a hydrocarbyl independently selected from $C_1$-$C_{18}$. It should be understood that the introduction of Q units can reduce the thermal expansion coefficient, but will increase the permittivity and the permittivity loss, so the introduction amount should be adjusted as needed. In addition, the introduction of D or M units can reduce the permittivity and the permittivity loss, but will increase the thermal expansion coefficient, so the introduction amount should be adjusted as needed. Preferably, the total content of Q units, D units, and/or M units in the spherical or angular siloxane is ≤20 wt %.

Preferably, the spherical or angular siloxane of S1 further comprises silicon dioxide particles. It should be understood that the introduction of silicon dioxide particles (also known as silicon dioxide fine powder) can reduce the thermal expansion coefficient, but will increase the permittivity and the permittivity loss, so the introduction amount should be adjusted as needed. Preferably, the total content of silicon dioxide particles in the spherical or angular siloxane is ≤70 wt %.

In preferred embodiments, the average particle size of the spherical or angular siloxane of S1 is 0.5-50 μm. In a preferred embodiment, the average particle size of the spherical or angular siloxane is 2 μm.

In preferred embodiments, the spherical or angular siloxane comprises 97% of spherical siloxane of T units and 3% of spherical siloxane of Q units or D units. In a preferred embodiment, the spherical or angular siloxane comprises 100% of spherical siloxane of T units. In a preferred embodiment, the spherical or angular siloxane comprises 100% of angular siloxane of T units. In a preferred embodiment, the spherical or angular siloxane comprises 70% of angular siloxane of T units and 30% of silicon dioxide particles.

In a preferred embodiment, $R_1$ of the T unit is methyl or vinyl.

Preferably, in S2, the heat treatment is realized by electric heating or microwave heating, wherein the Si—OHs of the spherical or angular siloxane are condensed to produce the SiOSi structure. The equation of the condensation reaction is as follows:

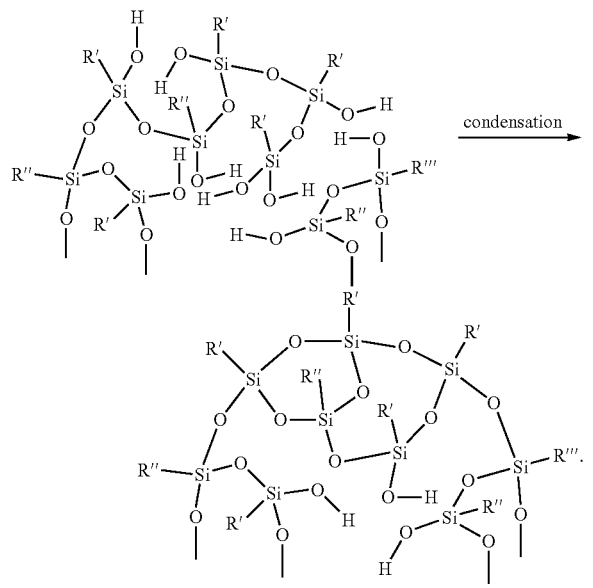

Wherein each of R', R'', R''' is a hydrogen atom or an organic group $R_1$ (also known as hydrocarbyl) independently selected from $C_1$-$C_{18}$.

Preferably, the heat treatment temperature of S2 is 250-400° C. Most preferably, the temperature is 250-320° C. It should be understood that too low temperature will result in incomplete Si—OHs condensation reaction, while too high temperature will result in decomposition of organic groups. For example, because the decomposition temperature of the phenyl group is relatively high, when the organic group is the phenyl group, the corresponding heat treatment temperature is higher than when the organic group is the alkyl. In preferred embodiments, the heat treatment time is between 30 minutes and 24 hours. It should be understood that when the temperature is higher, the required time is shorter, and when the temperature is lower, the required time is longer. In preferred embodiments, the heat treatment time is between 1 and −20 hours.

Preferably, the silane coupling agent of S3 is at least one agent selected from silane coupling agent $(R_7)_a(R_8)_b Si(M)_{4-a-b}$, wherein $R_7$, $R_8$ each is a hydrogen atom, a hydrocarbyl independently selected from $C_1$-$C_{18}$, or a hydrocarbyl independently selected from $C_1$-$C_{18}$ replaced by functional groups, and the functional group is at least one group selected from the group consisting of following organic functional groups: vinyl, allyl, styryl, epoxy group, aliphatic amino, aromatic amino, methacryloxypropyl, acryloxypropyl, ureidopropyl, chloropropyl, mercapto propyl, polysulfide, isocyanate propyl; M is an alkoxy group of $C_1$-$C_{18}$ or a halogen atom, a=0, 1, 2 or 3, b=0, 1, 2 or 3, and a+b=1, 2 or 3.

Preferably, the silane coupling agent is a silane coupling agent with free radical polymerization reaction, such as vinyl silane coupling agent; a silane coupling agent reacting with epoxy resin, such as epoxy silane coupling agent, or amino silane coupling agent; a hydrocarbyl silane coupling agent with high affinity to hydrophobic resins, such as dimethyldimethoxysilane, diphenyldimethoxysilane, phenyl silane coupling agent, or long-chain alkyl silane coupling agent. More preferably, the silane coupling agent is at least one coupling agent selected from the group consisting of: dimethyldimethoxysilane, methyltrimethoxysilane, phenyltrimethoxysilane, and vinyltrimethoxysilane. In particular, the silane coupling agent cannot be 100% of 3-methacryloxypropyltrimethoxysilane, nor 100% of hexyltrimethoxysilane (the molecular weight of the silane coupling agent is 206.35, its specific gravity at 25° C. is 0.92, and the quotient of the molecular weight divided by its specific gravity at 25° C. is 224.3, above 210).

Preferably, the disilazane of S3 is at least one agent selected from disilazane $(R_9R_{10}R_{11})SiNHSi(R_{12}R_{13}R_{14})$, wherein ach of $R_9$, $R_{10}$, $R_{11}$, $R_{12}$, $R_{13}$, $R_{14}$ is a hydrogen atom or a hydrocarbyl independently selected from $C_1$-$C_{18}$. More preferably, the disilazane is hexamethyldisilazane.

In preferred embodiments, the addition amount of the treatment agent in step S3 is 8-12 wt %. In a preferred embodiment, the addition amount of the treatment agent in step S3 is 10 wt %. In a preferred embodiment, the silicon hydroxyl groups in the condensed siloxane are condensed at 180° C. for 6 hours.

Preferably, the method comprises removing coarse oversize particles above 75 μm in the spherical or angular powder filler by dry or wet sieving or inertial classification. Preferably, coarse oversize particles above 55 μm in the spherical or angular powder filler are removed by dry or wet sieving or inertial classification. Preferably, coarse oversize particles above 45 μm in the spherical or angular powder filler are removed by dry or wet sieving or inertial classification. Preferably, coarse oversize particles above 20 μm in the spherical or angular powder filler are removed by dry or wet sieving or inertial classification. Preferably, coarse oversize particles above 10 μm in the spherical or angular powder filler are removed by dry or wet sieving or inertial classification. Preferably, coarse oversize particles above 5 μm in the spherical or angular powder filler are removed by dry or wet sieving or inertial classification. Preferably, coarse oversize particles above 3 μm in the spherical or angular powder filler are removed by dry or wet sieving or inertial classification. Preferably, coarse oversize particles above 1 μm in the spherical or angular powder filler are removed by dry or wet sieving or inertial classification.

The present invention also provides a spherical or angular powder filler obtained by above method, wherein the spherical or angular powder filler has a particle size of 0.1-50 μm, the volatile moisture content of the spherical or angular powder filler at 200° C. is less than or equal to 3000 ppm. Preferably, the particle size is 0.5-30 μm. The present invention provides silane coupling agent or disilazane with smaller molecular to block internal cracks, in order to reduce the moisture content of the powder, thereby avoiding the increase of the permittivity and the permittivity loss. In particular, the moisture content of the powder of the present invention can be calculated by Karl Fischer moisture at 200° C.

The measurement results show that the permittivity of the spherical or angular powder filler of the present invention at 500 MHz is only 2.5-2.8, which is less than 3, while the permittivity of the existing silicon dioxide filler of Q units is about 3.8-4.5. Therefore, the spherical or angular powder filler of the present invention has a greatly reduced permittivity, and can meet the material requirement of high-frequency signal in the 5G era.

The measurement results show that the permittivity loss of the spherical or angular powder filler of the present invention at 500 MHz is only 0.0005 to 0.002, which is less than 0.005, while the permittivity loss of the existing silicon dioxide filler of Q units is about 0.003-0.01. Therefore, the spherical or angular powder filler of the present invention has a greatly reduced permittivity loss, and can meet the material requirement of high-frequency signal in the 5G era.

The measurement results show that the thermal expansion coefficient of the spherical or angular powder filler of the present invention is 5-15 ppm, while the thermal expansion coefficient of the existing fused silicon dioxide is about 0.5 ppm, and the thermal expansion coefficient of the existing crystalline silicon dioxide (quartz) is 8-13 ppm. Therefore, the spherical or angular powder filler of the present invention has an equivalent thermal expansion coefficient to general inorganic filler, and can meet the material requirement of high-frequency signal in the 5G era.

The present invention further provides use of above spherical or angular powder filler, wherein the spherical or angular powder filler of different particle sizes is tightly packed in the resin to form a composite material. Preferably, the composite material is suitable for semiconductor packaging materials, circuit boards and intermediate semi-finished products. Preferably, the packaging material is molding compound, patch glue, underfill material or chip carrier. The molding compound is DIP package molding compound, SMT package molding compound, MUF, FO-WLP, or FCBGA molding compound. Preferably, the circuit board is HDI, high-frequency high-speed board, or motherboard.

It is known that the thermal expansion coefficient of the composite material can be approximately calculated by the following formula 1:

$$\alpha = V_1 \times \alpha_1 + V_2 \times \alpha_2 \qquad \text{Formula 1}$$

$\alpha$: the thermal expansion coefficient of the composite material; $V_1$: the volume fraction of the resin; $\alpha_1$: the thermal expansion coefficient of the resin; $V_2$: the volume fraction of the filler; and $\alpha_2$: the thermal expansion coefficient of the filler.

The thermal expansion coefficient $\alpha_1$ of the resin is 60-120 ppm. The thermal expansion coefficient $\alpha_2$ of the spherical or angular powder filler of the present invention is 5-15 ppm, much lower than the thermal expansion coefficient of the resin, which can reduce the thermal expansion coefficient of the cured resin composition like the existing inorganic filler, in order to match the thermal expansion of the wire metal or wafer. Therefore, by adjusting the volume fraction of the resin and the spherical or angular powder filler, the thermal expansion coefficient of the composite material can be designed to form the packaging material, circuit board and intermediate semi-finished product.

It is known that the permittivity of the composite material can be approximately calculated by the following formula 2:

$$\log \varepsilon = V_1 \times \log \varepsilon_1 + V_2 \times \log \varepsilon_2 \qquad \text{Formula 2}$$

$\varepsilon$: the permittivity of the composite material; $V_1$: the volume fraction of the resin; $\varepsilon_1$: the permittivity of the resin; $V_2$: the volume fraction of the filler; and $\varepsilon_2$: the permittivity of the filler.

Therefore, by adjusting the volume fraction of the resin and the spherical or angular powder filler, the permittivity of the composite material can be designed to form the packaging material, circuit board and intermediate semi-finished product.

In addition, the permittivity loss of the composite material is determined by the permittivity loss of the resin and the filler, and the number of polar groups on the surfaces of the filler. The spherical or angular powder filler according to the present invention has low permittivity and less polar groups on the surfaces of the filler, therefore, the composite material has low permittivity loss.

The spherical or angular powder filler obtained according to above method of the present invention has low permittivity and low permittivity loss. Moreover, since the raw materials of the method are all organic materials without involving the conventionally used angular crushed quartz, etc., and the product can be refined by industrial methods such as distillation, the obtained spherical or angular powder filler does not contain radioactive elements such as uranium or thorium, meeting the requirement without conductive impurities, without coarse oversize particles, and of low radioactivity. Further, the synthesis parameters of method of the present invention can be appropriately adjusted to produce the spherical or angular powder filler with a particle size of 0.1-50 μm.

DESCRIPTION OF THE ENABLING EMBODIMENT

The preferred embodiments of the present invention are given below and described in detail.

The detection methods involved in the following embodiments include:

The average particle size is measured by a laser particle size distribution instrument HORIBA LA-700, and the solvent is isopropanol;

The specific surface area is measured by SHIMADZU FlowSorbIII2305;

The true specific gravity is measured by MicrotracBEL BELPycno;

The thermal expansion coefficient of the filler is calculated from the known thermal expansion coefficient and true specific gravity of epoxy resin, the true specific gravity of the filler, and the measured thermal expansion coefficient of a resin sample containing a certain amount of filler.

Uranium or thorium content is measured by Agilent 7700X ICP-MS. The sample is prepared by total dissolution in hydrofluoric acid after burning at 800° C.;

The volatile moisture content at 200° C. is measured by Mitsubishi Chemical CA-310 Karl Fischer automatic analyzer with heated vaporizer.

The content of Q, T, D, or M units is measured by solid $^{28}$Si-NMR nuclear magnetic resonance spectrum of JEOL ECS-400 Nuclear magnetic resonance instrument, wherein the Q unit content is calculated from the peak integrated area between −80 ppm and −120 ppm; the T unit content is calculated from the peak integrated area between −30 ppm and −80 ppm; the D unit content is calculated from the peak integrated area between −10 ppm and −30 ppm; and the M unit content is calculated from the peak integrated area between +20 ppm and −10 ppm; referring to *Separation and Purification Technology* Volume 25, Issues 1-3, 1 Oct. 2001, Pages 391-397, $^{29}$Si NMR and Si2p XPS correlation in polysiloxane membranes prepared by plasma enhanced chemical vapor deposition.

The permittivity or the permittivity loss is measured by KEYCOM permittivity and permittivity loss measuring device Model No. DPS18 in perturbation method and sample hole block-shaped cavity resonance method.

In this text, temperature degree refers to "degrees Celsius", that is, ° C.

Referring to "Spherical Silicone Resin Micropowder", Huang Wenrun, Organic Silicone Materials, 2007, 21 (5) 294-299, the spherical siloxane of different compositions in Examples and Comparative Examples is prepared for subsequent heat treatment.

Methyltrichlorosilane or methyltrimethoxysilane was added into water to provide a white precipitate. After being washed with deionized water, the precipitate was ground by a sand mill to a fine powder of 2 μm in Examples and Comparative Examples for subsequent heat treatment.

In addition, methyltrichlorosilane or methyltrimethoxysilane was mixed with silicon dioxide, and the mixture was added into water to provide a white precipitate. After being washed with deionized water, the precipitate was ground by a sand mill to a fine powder of 2 μm in Examples and Comparative Examples for subsequent heat treatment.

Example 1

The spherical siloxane of 100% T units ($R_1$ is methyl) with a particle size of 2 μm was heat treated in an air atmosphere at different temperatures. The treated powder was mixed with 10% methyltrimethoxysilane (the molecular weight of the silane coupling agent is 136.22, its specific gravity at 25° C. is 0.955, and the quotient of the molecular weight divided by its specific gravity at 25° C. is 142.6, which is less than 210), the mixture was heated at 180° C. for 6 hours, and the powder was separated by cyclone to remove coarse oversize particles above 10 μm to obtain samples of Examples and Comparative Examples. The analysis results of the samples are listed in Table 1.

Obviously, the permittivity of each of the samples obtained according to Example 1 Example 3 is less than 3, and the permittivity loss each is less than 0.005, meeting the requirement of low permittivity (less signal delay) and low permittivity loss (less signal loss) of the filler in the 5G era. The heat treatment temperature of Comparative Example 1 is too low and the heat treatment temperature of Comparative Examples 2-3 is too high, wherein the permittivity each is above 3, and the permittivity loss each is above 0.005, failing to meet the requirement of low permittivity (less signal delay) and low permittivity loss (less signal loss) of the filler in the 5G era.

Example 2

The spherical siloxane of 97% T units ($R_1$ is methyl) and 3% Q units with a particle size of 2 μm was heat treated in an air atmosphere. The treated powder was mixed with 8% methyltrimethoxysilane and then mixed with 2% 3-methacryloxypropyltrimethoxysilane, the mixture was heated at 180° C. for 6 hours, and the powder was separated by cyclone to remove coarse oversize particles above 10 μm to obtain samples of Examples and Comparative Examples. The analysis results of the samples are listed in Table 2. The Comparative Example 4 differs from Example 4 without methyltrimethoxysilane, and the Comparative Example 5 differs from Example 4 only with 3-methacryloxypropyltrimethoxysilane (the molecular weight of the silane coupling agent is 248.35, its specific gravity at 25° C. is 1.045, and the quotient of the molecular weight divided by its specific gravity at 25° C. is 237.7, which is above 210).

TABLE 1

| | Composition of Spherical Siloxane | | | Heat | | Evaporated Water | | | Thermal |
|---|---|---|---|---|---|---|---|---|---|
| | T unit wt % | Q unit wt % | Average Particle Size μm | Treatment Temperature ° C. | Heat Treatment Time h | Volume at 200° C. ppm | Permittivity 500 MHz | Permittivity Loss 500 MHz | Expansion Coefficient ppm |
| Example 1 | 100 | 0 | 2.0 | 250 | 20 | 2900 | 2.9 | 0.002 | 12 |
| Example 2 | 100 | 0 | 2.0 | 280 | 20 | 2000 | 2.7 | 0.001 | 10 |
| Example 3 | 100 | 0 | 2.0 | 320 | 20 | 900 | 2.6 | <0.001 | 8 |
| Comparative Example 1 | 100 | 0 | 2.0 | 200 | 20 | 15000 | 3.9 | 0.01 | 17 |
| Comparative Example 2 | 100 | 0 | 2.0 | 450 | 20 | 2500 | 4.9 | 0.01 | 6 |
| Comparative Example 3 | 100 | 0 | 2.0 | 650 | 20 | 1000 | 5.1 | 0.01 | 6 |

TABLE 2

| | Composition of Spherical Siloxane | | | Heat | | Evaporated Water | | | Thermal |
|---|---|---|---|---|---|---|---|---|---|
| | T unit wt % | Q unit wt % | Average Particle Size μm | Treatment Temperature °C. | Heat Treatment Time h | Volume at 200° C. ppm | Permittivity 500 MHz | Permittivity Loss 500 MHz | Expansion Coefficient ppm |
| Example 4 | 97 | 3 | 2.0 | 280 | 20 | 1200 | 2.7 | <0.001 | 9 |
| Comparative Example 4 | 97 | 3 | 2.0 | 280 | 20 | 3500 | 3.3 | 0.009 | 9 |
| Comparative Example 5 | 97 | 3 | 2.0 | 280 | 20 | 3600 | 3.4 | 0.009 | 9 |

Obviously, the permittivity of the sample obtained according to Example 4 is less than 3, and the permittivity loss is less than 0.005, meeting the requirement of low permittivity (less signal delay) and low permittivity loss (less signal loss) of the filler in the 5G era. The Comparative Example 4 without silane coupling agent for condensing silicon hydroxyl groups and the Comparative Example 5 with silane coupling agent, the quotient of whose molecular weight divided by its specific gravity at 25° C. is above 210, for condensing silicon hydroxyl groups provide the samples with permittivity above 3 and permittivity loss above 0.005, failing to meet the requirement of low permittivity (less signal delay) and low permittivity loss (less signal loss) of the filler in the 5G era.

Example 3

The spherical siloxane of 97% T units ($R_1$ is methyl) and 3% D units ($R_2$, $R_3$ each is methyl) with a particle size of 2 μm was heat treated in an air atmosphere. The treated powder was mixed with 10% hexamethyldisilazane (the molecular weight of the disilazane is 161.39, its specific gravity at 25° C. is 0.774, and the quotient of the molecular weight divided by its specific gravity at 25° C. is 208.5, which is less than 210), the mixture was heated at 180° C. for 6 hours, and the powder was separated by cyclone to remove coarse oversize particles above 10 μm to obtain the sample of Example. The analysis results of the sample are listed in Table 3.

TABLE 3

| | Composition of Spherical Siloxane | | | Heat | | Evaporated Water | | | Thermal |
|---|---|---|---|---|---|---|---|---|---|
| | T unit wt % | Q unit wt % | Average Particle Size μm | Treatment Temperature °C. | Heat Treatment Time h | Volume at 200° C. ppm | Permittivity 500 MHz | Permittivity Loss 500 MHz | Expansion Coefficient ppm |
| Example 5 | 97 | 3 | 2.0 | 280 | 20 | 800 | 2.7 | <0.001 | 10 |

Obviously, the permittivity of the sample obtained according to Example 5 is less than 3, and the permittivity loss is less than 0.005, meeting the requirement of low permittivity (less signal delay) and low permittivity loss (less signal loss) of the filler in the 5G era.

Example 4

Methyltrimethoxysilane and silicon dioxide were mixed and then added into water to provide a white precipitate. After being washed with deionized water, the precipitate was ground by a sand mill to a fine powder of 2 μm.

The angular siloxane of 70% T units ($R_1$ is methyl) and 30% silicon dioxide fine powder (gas phase white carbon black) with a particle size of 2 μm was heat treated in an air atmosphere. The treated powder was mixed with 10% dimethyldimethoxysilane (the molecular weight of the disilazane is 120.22, its specific gravity at 25° C. is 0.88, and the quotient of the molecular weight divided by its specific gravity at 25° C. is 136.6, which is less than 210), the mixture was heated at 180° C. for 6 hours, and the powder was separated by cyclone to remove coarse oversize particles above 10 μm to obtain the sample of Example. The analysis results of the sample are listed in Table 4.

TABLE 4

| | Composition of Angular Siloxane | | | Heat | | Evaporated Water | | | Thermal |
|---|---|---|---|---|---|---|---|---|---|
| | T unit wt % | silicon dioxide wt % | Average Particle Size μm | Treatment Temperature ° C. | Heat Treatment Time h | Volume at 200° C. ppm | Permittivity 500 MHz | Permittivity Loss 500 MHz | Expansion Coefficient ppm |
| Example 6 | 70 | 30 | 2.0 | 280 | 20 | 900 | 2.9 | <0.001 | 3 |

Obviously, the permittivity of the sample obtained according to Example 6 is less than 3, and the permittivity loss is less than 0.005, meeting the requirement of low permittivity (less signal delay) and low permittivity loss (less signal loss) of the filler in the 5G era.

Example 5

The spherical siloxane of 100% T units ($R_1$ is methyl) with a particle size of 2 μm was heat treated in an air atmosphere. The treated powder was mixed with 8% vinyltrimethoxysilane (the molecular weight of the disilazane is 148.23, its specific gravity at 25° C. is 0.971, and the quotient of the molecular weight divided by its specific gravity at 25° C. is 152.7, which is less than 210) and then mixed with 4% hexamethyldisilazane, the mixture was heated at 180° C. for 6 hours, and the powder was separated by cyclone to remove coarse oversize particles above 10 μm to obtain the sample of Example 7. The analysis results of the sample are listed in Table 5.

The spherical siloxane of 100% T units ($R_1$ is methyl) with a particle size of 2 μm was heat treated in an air atmosphere. The treated powder was mixed with the mixture of 8% phenyltrimethoxysilane (the molecular weight of the disilazane is 198.29, its specific gravity at 25° C. is 1.062, and the quotient of the molecular weight divided by its specific gravity at 25° C. is 186.7, which is less than 210) and 4% hexamethyldisilazane, the mixture was heated at 180° C. for 6 hours, and the powder was separated by cyclone to remove coarse oversize particles above 10 μm to obtain the sample of Example 8. The analysis results of the sample are listed in Table 5.

TABLE 5

| | Composition of Spherical Siloxane | | | Heat | | Evaporated Water | | | Thermal |
|---|---|---|---|---|---|---|---|---|---|
| | T unit wt % | Q unit wt % | Average Particle Size μm | Treatment Temperature °C. | Heat Treatment Time h | Volume at 200° C. ppm | Permittivity 500 MHz | Permittivity Loss 500 MHz | Expansion Coefficient ppm |
| Example 7 | 100 | 0 | 2.0 | 280 | 20 | 1900 | 2.6 | <0.001 | 9 |
| Example 8 | 100 | 0 | 2.0 | 280 | 20 | 1800 | 2.8 | <0.001 | 9 |

Obviously, the permittivity of each of samples obtained according to Example 7—Example 8 is less than 3, and the permittivity loss is less than 0.005, meeting the requirement of low permittivity (less signal delay) and low permittivity loss (less signal loss) of the filler in the 5G era.

Example 6

The spherical siloxane of 100% T units ($R_1$ is vinyl) with a particle size of 2 μm was heat treated in an air atmosphere. The treated powder was mixed with 8% hexamethyldisilazane, the mixture was heated at 180° C. for 6 hours, and the powder was separated by cyclone to remove coarse oversize particles above 10 μm to obtain the sample of Example 9. The analysis results of the sample are listed in Table 6.

The spherical siloxane of 100% T units ($R_1$ is methyl) with a particle size of 2 μm was heat treated in an air atmosphere. The treated powder was mixed with 4% phenyltrimethoxysilane, the mixture was heated at 180° C. for 6 hours, and the powder was separated by cyclone to remove coarse oversize particles above 10 μm to obtain the sample of Example 10. The analysis results of the sample are listed in Table 6.

TABLE 6

| | Composition of Spherical Siloxane | | | Heat | | Evaporated Water | | | Thermal |
|---|---|---|---|---|---|---|---|---|---|
| | T unit wt % | Q unit wt % | Average Particle Size μm | Treatment Temperature °C. | Heat Treatment Time h | Volume at 200° C. ppm | Permittivity 500 MHz | Permittivity Loss 500 MHz | Expansion Coefficient ppm |
| Example 9 | 100 | 0 | 2.0 | 250 | 20 | 2500 | 2.6 | <0.001 | 9 |
| Example 10 | 100 | 0 | 2.0 | 300 | 20 | 1000 | 2.9 | <0.001 | 9 |

Obviously, the permittivity of each of samples obtained according to Example 9—Example 10 is less than 3, and the permittivity loss is less than 0.005, meeting the requirement of low permittivity (less signal delay) and low permittivity loss (less signal loss) of the filler in the 5G era.

Example 7

The spherical siloxane of 100% T units ($R_1$ is methyl) with different particle sizes was heat treated in an air atmosphere in different time. The treated powder was mixed with 8% methyltrimethoxysilane, the mixture was heated at 180° C. for 6 hours to obtain samples of Examples. The analysis results of the sample are listed in Table 7.

TABLE 7

|  | Composition of Spherical Siloxane | | | Heat | | Evaporated Water | | | | Thermal |
|---|---|---|---|---|---|---|---|---|---|---|
|  | T unit wt % | Q unit wt % | Average article Size μm | Treatment Temperature ° C. | Heat Treatment Time h | Volume at 200° C. ppm | Permittivity 500 MHz | Permittivity Loss 500 MHz | Expansion Coefficient ppm | |
| Example 11 | 100 | 0 | 0.5 | 290 | 1 | 800 | 2.60 | <0.001 | 10 |
| Example 12 | 100 | 0 | 2.0 | 290 | 3 | 800 | 2.61 | <0.001 | 10 |
| Example 13 | 100 | 0 | 10 | 290 | 7 | 800 | 2.60 | <0.001 | 9 |
| Example 14 | 100 | 0 | 30 | 290 | 15 | 800 | 2.60 | <0.001 | 9 |
| Example 15 | 100 | 0 | 50 | 290 | 20 | 800 | 2.59 | <0.001 | 8 |

Obviously, the permittivity of each of samples obtained according to Example 11 Example 15 is less than 3, and the permittivity loss is less than 0.005, meeting the requirement of low permittivity (less signal delay) and low permittivity loss (less signal loss) of the filler in the 5G era.

Example 8

Methyltrichlorosilane was added into water to provide a white precipitate. After being washed with deionized water, the precipitate was ground by a sand mill to a fine powder of 2 μm, filtrated, dried and heat treated in a nitrogen atmosphere. The treated powder was mixed with 15% methyltrimethoxysilane, the mixture was heated at 180° C. for 6 hours and the powder was separated by cyclone to remove coarse oversize particles above 10 μm to obtain the sample of Example. The analysis results of the sample are listed in Table 8.

TABLE 8

|  | Composition of Spherical Siloxane | | | Heat | | Evaporated Water | | | | Thermal |
|---|---|---|---|---|---|---|---|---|---|---|
|  | T unit wt % | Q unit wt % | Average Particle Size μm | Treatment Temperature ° C. | Heat Treatment Time h | Volume at 200° C. ppm | Permittivity 500 MHz | Permittivity Loss 500 MHz | Expansion Coefficient ppm | |
| Example 16 | 100 | 0 | 2.0 | 280 | 20 | 900 | 2.9 | 0.005 | 11 |

Obviously, the permittivity of the sample obtained according to Example 16 is less than 3, and the permittivity loss is less than 0.005, meeting the requirement of low permittivity (less signal delay) and low permittivity loss (less signal loss) of the filler in the 5G era.

It should be understood that samples of above Example 1—Example 16 can be vertex cut to remove coarse oversize particles. Specifically, coarse oversize particles above 1, 3, 5, 10, 20, 45, 55, or 75 μm in the spherical or angular powder filler can be removed by dry or wet sieving or inertial classification according to the size of the semiconductor chip. Further, Uranium or thorium content of samples of above Example 1—Example 16 is less than 0.5 ppb, wherein the samples were dissolved in hydrofluoric acid and measured by ICP-MS.

The foregoing description refers to preferred embodiments of the present invention, and is not intended to limit the scope of the present invention. Various changes can be made to the foregoing embodiments of the present invention. That is to say, all simple and equivalent changes and modifications made in accordance with the claims of the present invention and the content of the description fall into the protection scope of the patent of the present invention. What is not described in detail in the present invention is conventional technical content.

What is claimed is:

1. A method for preparing a spherical or angular powder filler, comprising the steps of:
    S1, providing a spherical or angular siloxane comprising T units, wherein the T unit=$R_1SiO_3$—, and $R_1$ is a hydrogen atom or an organic group independently selected from $C_1$-$C_{18}$;
    S2, performing a heat treatment on the spherical or angular siloxane, the heat treatment temperature between 250° C. and the temperature of oxidative decomposition of organic groups, the heat treatment time is 30 min-24 h, so that silicon hydroxyl groups in the spherical or angular siloxane are condensed to obtain a condensed siloxane, wherein new isolated outer surface Si—OHs and internal cracked surface Si—OHs are produced due to the spatial geometric limitation of the condensed siloxane; and
    S3, adding a treatment agent to treat the condensed siloxane to promote the condensation of silicon hydroxyl groups in the condensed siloxane to give a spherical or angular powder filler, the treatment agent comprising a silane coupling agent and/or disilazane, the weight percentage of the treatment agent being 0.5-50 wt %, and the quotient of the molecular weight of at least a portion of the silane coupling agent and/or the disilazane divided by its specific gravity at 25° C. being less than or equal to 210, wherein the silane coupling agent and/or disilazane enters the internal cracks of the powder due to its small molecule in order to promote the condensation of the internal cracked surface Si—OHs.

2. The method according to claim 1, wherein the spherical or angular siloxane further comprises Q units, D units, and/or M units, wherein the Q unit=$SiO_4$—, the D unit=$R_2R_3SiO_2$—, the M unit=$R_4R_5R_6SiO_2$—, and each of $R_2$, $R_3$, $R_4$, $R_5$, $R_6$ is a hydrogen atom or a hydrocarbyl independently selected from $C_1$-$C_{18}$.

3. The method according to claim 1, wherein the spherical or angular siloxane further comprises silicon dioxide particles.

4. The method according to claim 1, wherein the heat treatment temperature of S2 is 250-320° C.

5. The method according to claim 1, wherein the silane coupling agent is at least one agent selected from silane coupling agent $(R_7)_a(R_8)_b Si(M)_{4-a-b}$, wherein $R_7$, $R_8$ each is a hydrogen atom, a hydrocarbyl independently selected from $C_1$-$C_{18}$, a hydrocarbyl independently selected from $C_1$-$C_{18}$ replaced by functional groups, wherein the functional group is at least one group selected from the group consisting of following organic functional groups: vinyl, allyl, styryl, epoxy group, aliphatic amino, aromatic amino, methacryloxypropyl, acryloxypropyl, ureidopropyl, chloropropyl, mercapto propyl, polysulfide, isocyanate propyl; and wherein M is an alkoxy group of $C_1$-$C_{18}$ or a halogen atom, a=0, 1, 2 or 3, b=0, 1, 2 or 3, and a+b=1, 2 or 3.

6. The method according to claim 1, wherein the disilazane is at least one agent selected from disilazane $(R_9 R_{10} R_{11})SiNHSi(R_{12}R_{13}R_{14})$, and wherein $R_9$, $R_{10}$, $R_{11}$, $R_{12}$, $R_{13}$, $R_{14}$ each is a hydrogen atom or a hydrocarbyl independently selected from $C_1$-$C_{18}$.

7. The method according to claim 1, wherein the method further comprises removing coarse oversize particles above 1, 3, 5, 10, 20, 45, 55, or 75 m in the spherical or angular powder filler by dry or wet sieving or inertial classification.

8. The method according to claim 1, wherein the spherical or angular powder filler has a particle size of 0.1-50 m, and wherein the volatile moisture content of the spherical or angular powder filler at 200° C. is less than or equal to 3000 ppm.

9. The method according to claim 8, wherein the spherical or angular powder filler is tightly packed in the resin to form a composite material.

10. The method according to claim 9, wherein the composite material is suitable for semiconductor packaging material, circuit board and intermediate semi-finished product.

* * * * *